United States Patent
Natarajan et al.

(10) Patent No.: US 7,844,181 B2
(45) Date of Patent: Nov. 30, 2010

(54) SIMPLE FIBRE CHANNEL SPEED NEGOTIATION ACROSS TRANSPORT

(75) Inventors: Sriram Natarajan, Sunnyvale, CA (US); Jayakrishna M. Menon, Cupertino, CA (US); Gary K. Chan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1293 days.

(21) Appl. No.: 11/276,563

(22) Filed: Mar. 6, 2006

(65) Prior Publication Data

US 2007/0206947 A1    Sep. 6, 2007

(51) Int. Cl.
*H04J 14/02*    (2006.01)
(52) U.S. Cl. ............... 398/79; 398/25; 398/58; 398/98; 398/99; 398/100; 398/75; 370/466; 370/252; 370/392
(58) Field of Classification Search .......... 398/166, 398/51, 59, 83, 91, 135, 25, 43, 45, 48, 57, 398/154, 79, 75, 98, 99, 100, 58; 370/466, 370/503, 474, 465, 252, 253, 392
See application file for complete search history.

(56) References Cited

U.S. PATENT DOCUMENTS

| | | | |
|---|---|---|---|
| 6,215,793 B1 | 4/2001 | Gultekin et al. | |
| 6,285,659 B1 | 9/2001 | Feuerstraeter et al. | |
| 6,477,171 B1 | 11/2002 | Wakeley et al. | |
| 6,594,070 B2 * | 7/2003 | Sugata et al. | 359/326 |
| 6,832,052 B1 * | 12/2004 | Marmur | 398/175 |
| 6,952,533 B2 * | 10/2005 | Kim et al. | 398/166 |
| 7,164,692 B2 * | 1/2007 | Cox et al. | 370/466 |
| 7,421,203 B2 * | 9/2008 | Kim et al. | 398/59 |
| 2002/0041571 A1 | 4/2002 | Huff | |
| 2002/0089737 A1 * | 7/2002 | Sugata et al. | 359/326 |
| 2005/0018650 A1 | 1/2005 | Dropps et al. | |

\* cited by examiner

*Primary Examiner*—Hanh Phan (57) ABSTRACT

A method for negotiating speed between a Fiber Channel (FC) local client and a remote FC client across a DWDM network is provided. A transmission speed of the local FC client at a local ingress transport interface is detected. The data from the local FC client is forwarded along with the detected transmission speed to a remote egress transport interface. The remote egress interface forwards the data at the detected transmission speed to the remote FC client. The present invention eliminates complex speed negotiation state machines that would otherwise be required to make the DWDM transport behave like a virtual wire with respect to the FC ports and to allow the FC clients to negotiate the desired speed directly between themselves.

24 Claims, 5 Drawing Sheets

SIMPLE FIBRE CHANNEL SPEED NEGOTIATION ACROSS TRANSPORT

FIELD OF THE INVENTION

The present invention relates to electronic network communications systems. More particularly, the present invention relates to Fibre Channel speed negotiation.

BACKGROUND OF THE INVENTION

The Fibre Channel ("FC") is an architecture and a hierarchical set of protocols that define a data communications network for interconnecting a number of different computers and peripheral devices. The FC supports a variety of upper-level protocols, including the Small Computer Systems Interface ("SCSI") protocol. A computer or peripheral device is linked to the network through an FC port and copper wires or optical fibres. An FC port includes a transceiver and an interface controller. The computer peripheral device in which an FC port is contained is called a "host," and the combination of an FC port and a host is called an "FC node." An FC port exchanges data with a host via a local data bus, such as a Peripheral Computer Interface ("PCI") bus. The interface controller controls lower-level protocol exchanges between the fibre channel and the computer or peripheral device in which the FC port resides.

An interface controller within an FC port serves essentially as a transducer between serial receiver and transmitter components of the FC port and the host processor of the FC node in which the FC port is contained. On the input side, the interface controller is concerned with assembling serially-encoded data received from the receiver component into ordered sets of bytes, assembling the ordered sets of bytes into FC primitives and FC frames, performing internal state transitions in order to conform to lower-level FC protocols, and passing FC frames, along with status information, to the host processor within the context of larger collections of FC frames, called FC sequences and FC exchanges. On the output side, the interface controller accepts host memory buffer references and control information from the host processor and transforms them into FC frames within the context of FC sequences and FC exchanges, providing the FC frames to the transmitter component of the FC port for serial transmission to the FC, and transmits FC primitives in response to received FC primitives and state transitions in order to conform to lower-level FC protocols.

FC nodes may transmit and receive data through the FC at different rates. It is desirable for FC nodes, upon power up and initialization, to automatically determine the highest common data transmission and reception rate among all the nodes of the FC network in order to maximize data transmission rates through the FC. According to Fibre Channel Framing and Signaling (FC-FS) standards, each FC port is allowed to support up to four different speed rates. The problem with two FC interfaces communicating over a DWDM transport network is that either each edge device needs to be preconfigured to the same single rate or the complex FC speed negotiation state machine needs to be implemented at both edges. The acronym DWDM refers to Dense Wavelength Division Multiplexing, which is an optical technology used to increase bandwidth over existing fiber optic backbones by combining and transmitting multiple signals simultaneously at different wavelengths on the same fiber.

Therefore, a need exists for a method avoiding complex speed negotiation state machines as per FC-FS standard to make the DWDM transport behave like a virtual wire with respect to the FC ports and allow the FC clients to negotiate the desired speed directly between themselves. A primary purpose of the present invention is to solve these needs and provide further related advantages.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a Fibre Channel network communications system. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hard-wired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

Figure 1:
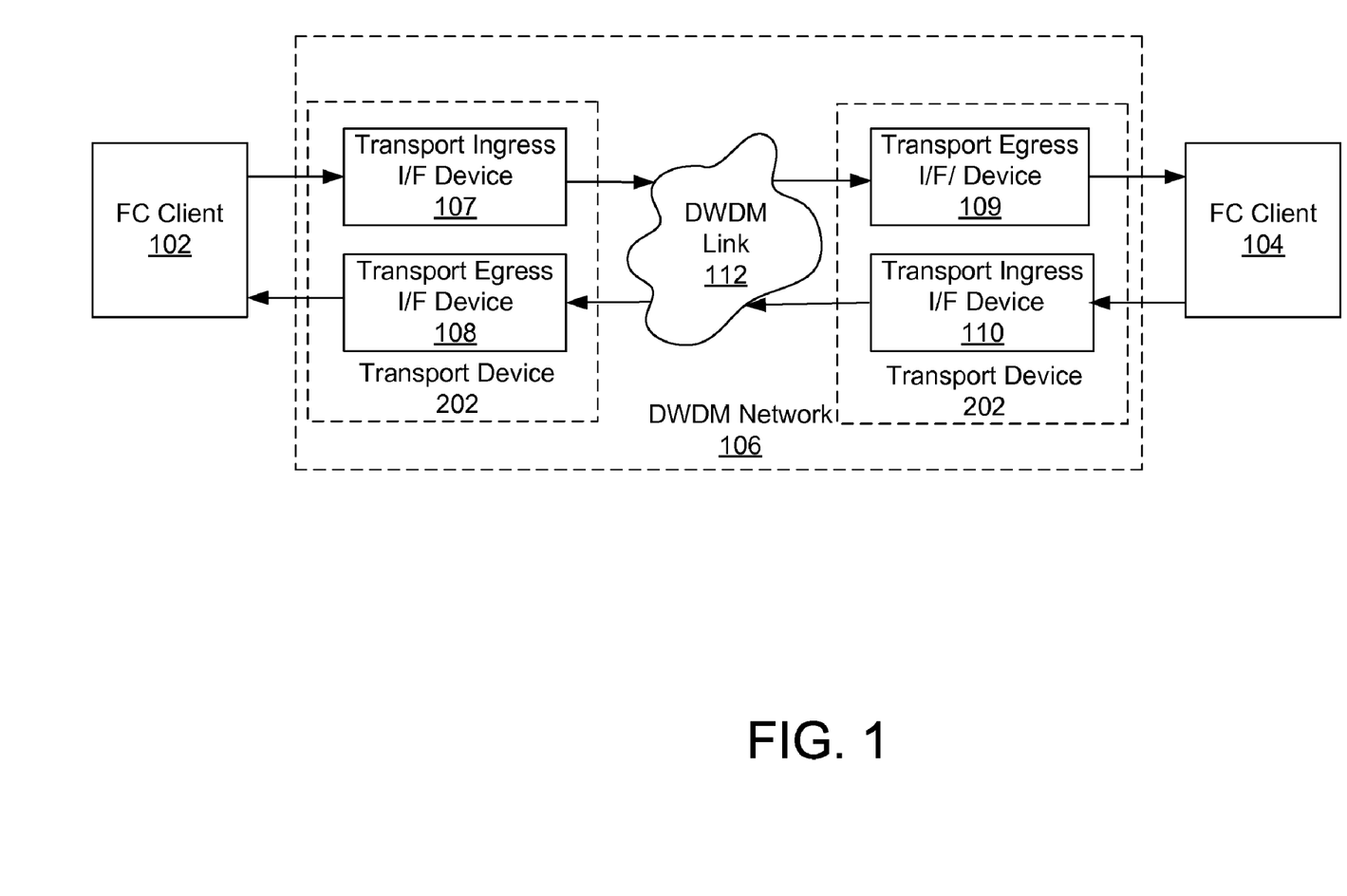
FIG. 1 is a block diagram schematically illustrating a Fibre Channel communication system in accordance with one embodiment of the present invention.

FIG. 1 is a block diagram schematically illustrating a Fibre Channel (FC) communication system in accordance with one embodiment of the present invention. A local FC client 102 communicates with a remote FC client 104 through a DWDM network 106. It will be appreciated that the designation of a FC client as either local or remote is for convenience only in the description of this embodiment and is not intended to imply any specific spatial relationship or other limitation. Each FC client includes a port supporting up to four different speed rates. Each FC client steps through all of its supported communication speeds starting with the highest speed rate. The speed must be acquired within the allowed sampling time window which is typically between about 2 msec to 30 msec. Each speed is sampled within the allowed sample time although it is preferred that the speed be sampled in less than 0.1 msec or faster. Each speed is also transmitted for 154 msec to ensure the receiving port has sufficient time to perform four full receive samples to acquire synchronization. The above transmit and receive procedures are repeated multiple times until the highest mutually supported speed is found or a watchdog timer has expired.

With the DWDM network 106 sitting between the local FC client 102 and the remote FC client 104, one way of avoiding any complex speed negotiation state machine implementation for each FC client by the DWDM transport device is to have the DWDM network 106 behave like a virtual wire to the FC ports with respect to port speed.

The DWDM network 106 includes a transport ingress interface 107 communicating with a transport egress interface 109 through a DWDM link 112. One skilled in the art will appreciate that DWDM link 112 includes the switch fabric and network infrastructure devices linked to the fiber optic backbone. The local FC client 102 is coupled to the transport ingress interface 107. The remote FC client 104 is coupled to the transport egress interface 109. Return traffic from FC client 104 to local client 102 traverses DWDM network 106 in the opposite direction. Specifically, remote FC client 104 is coupled to a transport ingress interface 110 and local FC client 102 is coupled to a transport egress interface 108. Transport interfaces 110 and 108 communicate through the DWDM link 112.

The local FC client 102 transmits data to the transport ingress interface 107. The transport ingress interface 107 detects the transmission speed from the local FC client 102 and encapsulates the detected transmission speed with the data from the local FC client 102. The encapsulated transmission speed and data is sent over the DWDM link 112 to the transport egress interface 109 which extracts the transmission speed and data. The transport egress interface 109 forwards the data from the local FC client 102 to the remote FC client 104 using the transmission speed detected at the transport ingress interface 107.

Figure 2:
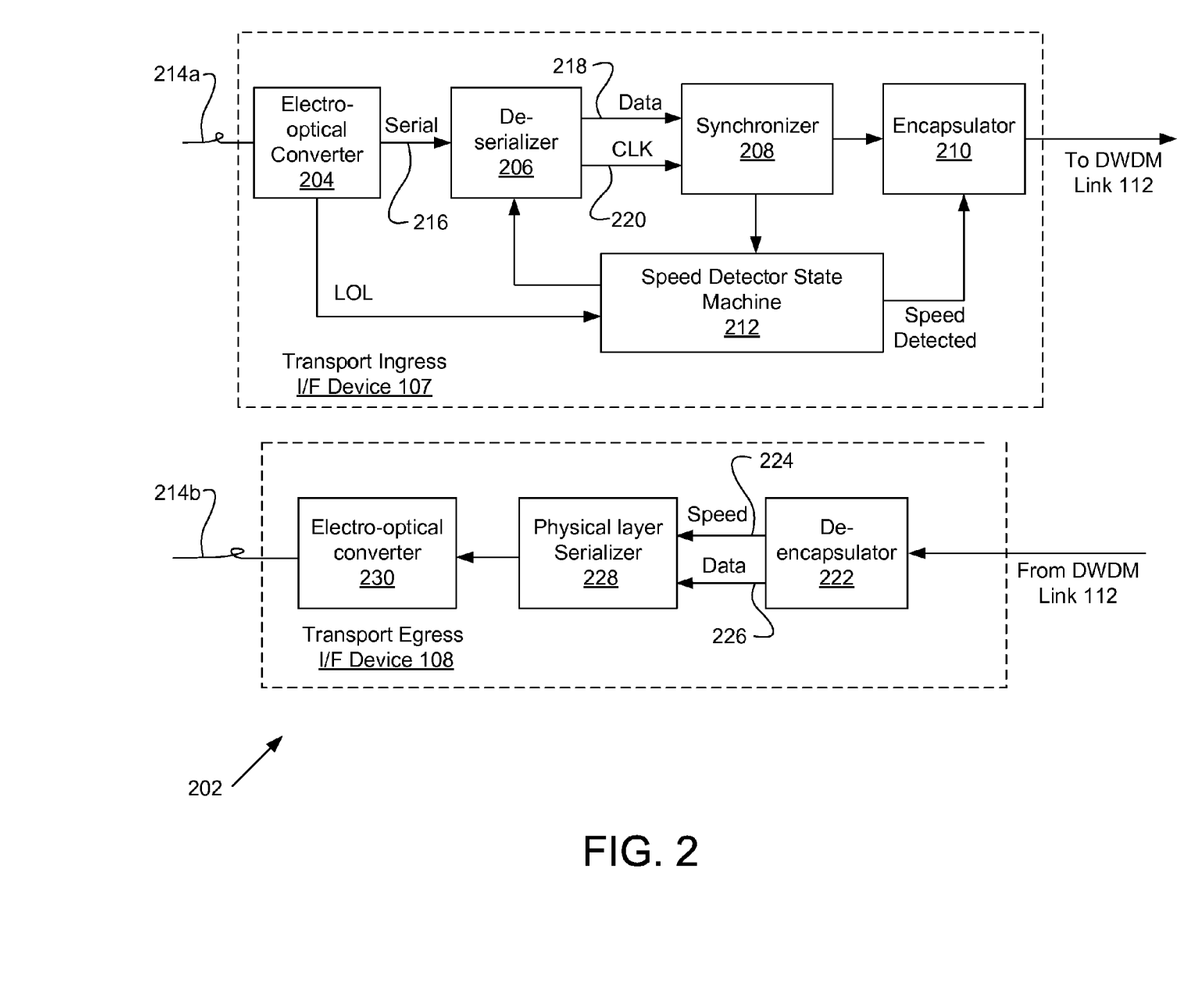
FIG. 2 is a block diagram schematically illustrating a transport device in accordance with one embodiment of the present invention.

FIG. 2 is a block diagram schematically illustrating a transport device 202 (see FIG. 1) in accordance with one embodiment of the present invention. Each transport device 202 includes a transport ingress interface, such as device 107 in FIG. 1, and a transport egress interface, such as device 108 in FIG. 1. Each transport ingress interface includes an opto-electrical converter 204, a deserializer 206, a synchronizer 208, an encapsulator 210, and a speed detector state machine 212.

The opto-electrical converter 204 communicates with an FC client (such as FC client 102) through an optical link 214a. The opto-electrical converter 204 converts optical signal into electrical signals. The electrical signals are forwarded to the deserializer 206 through a serial link 216. The opto-electrical converter 204 also forwards any signal that indicates a loss of light or loss of signals to the speed detector 212.

The deserializer 206 outputs a data link 218 and a clock link 220 to the synchronizer 208.

The synchronizer 208 receives data from the data link 218 and clock signal from clock link 220 from the deserializer 206 and forwards the data to the encapsulator 210, and the speed information to the speed detector state machine 212.

Figure 3:
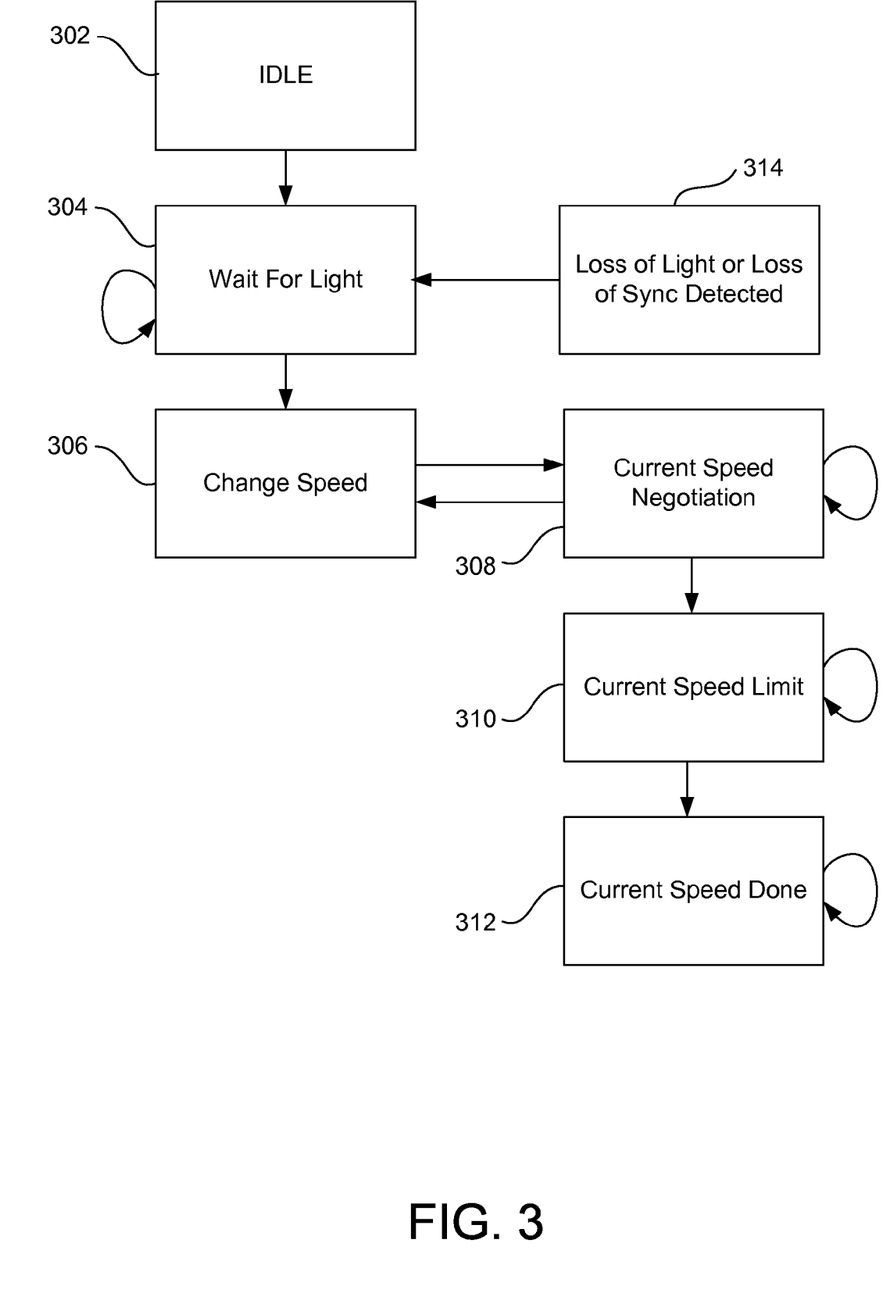
FIG. 3 is a flow diagram schematically illustrating a method for transporting speed information between two clients across a DWDM network in accordance with one embodiment of the present invention.
Figure 4:
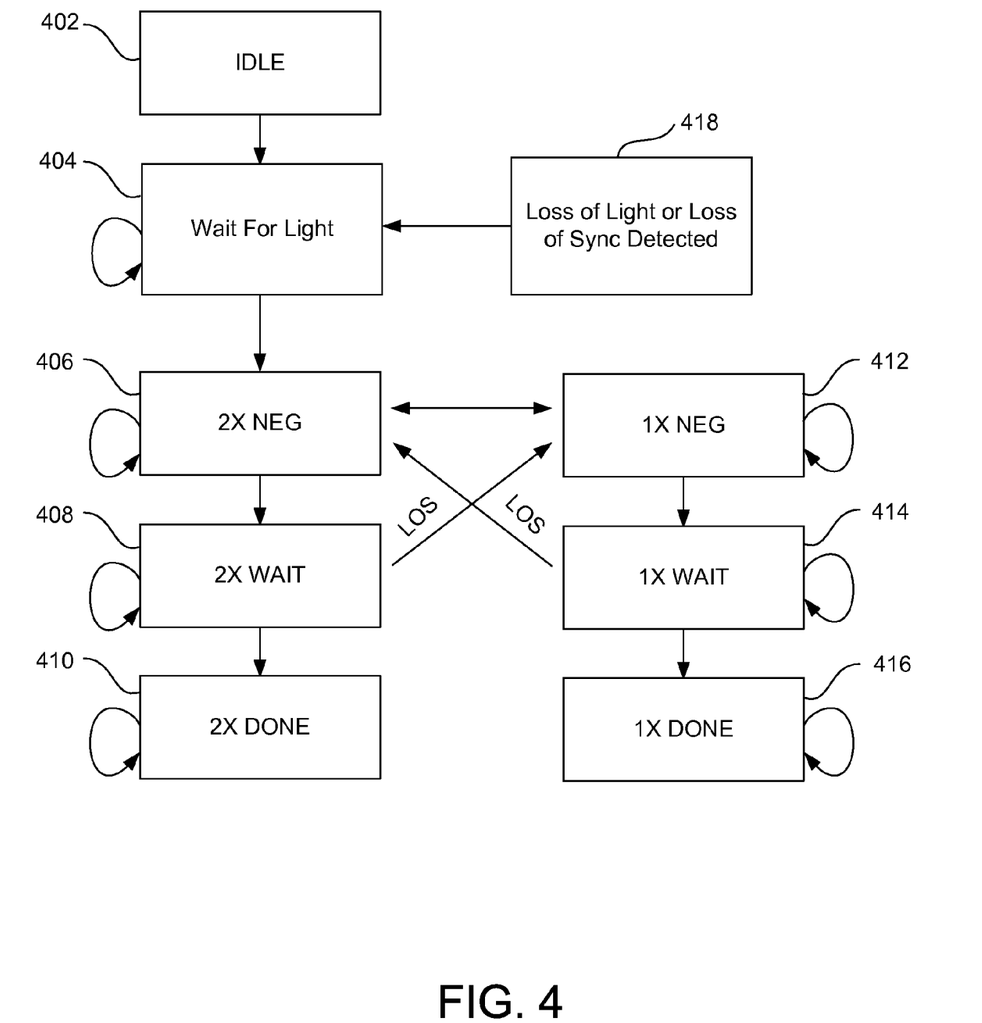
FIG. 4 is a flow diagram schematically illustrating a method for transporting speed information between two clients across a DWDM network in accordance with another embodiment of the present invention.

The speed detector state machine 212 receives the speed sync information from the synchronizer 208 and determines the data speed of the optical link 214 using the algorithm described in FIGS. 3 and 4. Upon detecting the reception speed, the speed detector state machine 212 forwards that information to the encapsulator 210.

Figure 5:
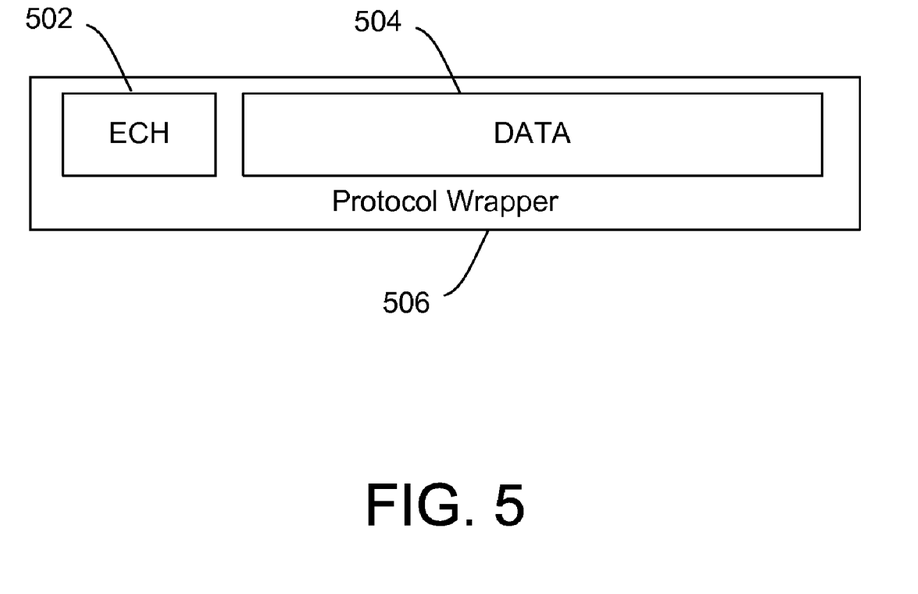
FIG. 5 illustrates a transport device encapsulation header (ECH) in accordance with one embodiment of the present invention.

The encapsulator 210 receives the data from the synchronizer 208 and the transmission speed from the speed detector 212. The encapsulator 210 encapsulates the transmission speed and other control information of the FC client in an Encapsulation Control Header (ECH) along with the data and forwards it to the DWDM link 112. An example of an encapsulated ECH header 502 pre-pended with data 504 in a first protocol that is mapped into second protocol wrapper 506 is shown in FIG. 5. Once encapsulated, encapsulator 210 sends the wrapper 506 across the DWDM link 112 to the transport egress interface, such as transport egress interface 109 (see FIG. 1).

Referring again to FIG. 2, each transport egress interface, such as device 108, includes a remote de-encapsulator 222 that must de-encapsulate the ECH to recover the encapsulated speed information along with the data from the encapsulator 210. The de-encapsulator 222 preferably outputs a transmission speed information link 224 and a data link 226.

A physical layer serializer 228 may be connected to the second de-encapsulator 222 to receive the speed information link 224 and the data link 226. An electro-optical converter 230 may be coupled to an output of the physical layer serializer 228 and communicates the data to the local FC client 102 on link 214b.

FIG. 3 is a flow diagram schematically illustrating a method for transporting speed information between two clients across a DWDM network in accordance with one embodiment of the present invention. At 302, the speed detector 212 is in an Idle state where the speed negotiation is disabled. In the Idle state, the transport device forwards received traffic stream from the local client port to the remote client port at the pre-configured speed rate.

Upon enabling the speed negotiation, the state of the transport device changes to wait for light at 304. In this state, the transport device sends data with code violation to the remote client port at the current speed rate. Transition from 304 to Change Speed state 306 takes place when loss of light and loss of signal are not present.

In the Change Speed state at 306, the transport device resets and starts sampling with the highest supported speed first. On entering this state each time, the transport device sets the current speed as the next supported speed and transitions to the Current Speed Negotiation state at 308.

At 308, the transport device starts sampling at the current speed. If the transport device has received at least 1000 consecutive valid FC ordered sets within 1 msec, the state of the transport device changes to the Current Speed Wait at 310. Otherwise, the transport device cannot lock to the current speed and will thus attempt to lock at the next supported speed instead.

At 310, the transport device waits to receive at least 16 consecutive identical FC primitive sequence ordered set before determining that the speed negotiation is completed and the final speed is set to be the current speed at 312. This state is the final state where the FC clients login and proceeds with data frames.

The speed negotiation process is considered completed when the local transport device has received 16 consecutive identical FC primitive sequence ordered sets from the local client port. At this point, the local transport device will lock to the latest detected port speed and will not restart the speed negotiation process until a transceiver Loss of Light condition is detected or the loss of word synchronization condition has existed for a timed duration that exceeds a pre-configured duration. Should there be any loss of signal or loss of word synchronization be detected then transition to state 314, then unconditionally the transport device returns to the wait for light state at 304 to resynchronize.

During the Current Speed Negotiation state 308, the Current Speed Wait state 310, and the Current Speed Done state 312, the transport device forwards all received traffic stream from the local client port to the remote client port at the Current Speed. If a loss of light or signal is detected in any of these states, the return is to state 304.

FIG. 4 is a flow diagram schematically illustrating a method for transporting speed information between two clients across a DWDM network in accordance with another embodiment of the present invention. In particular, FIG. 4 illustrates one method of how the speed detection state machine of the local transport device functions. The initial IDLE state is displayed at 402 wherein the local transport device awaits to enable the speed negotiation mode. After the speed negotiation mode is enabled at 404 (wait for light state), the local transport device starts with 2 G speed detection (2× NEG state) when no SFP loss of light and loss of word sync condition is detected. The local transport device than configures the PHY to 2 G RX rate. If more than 1000 consecutive valid Ordered Sets are detected within 1 msec, the local transport device moves to 2× WAIT state at 408 to wait for 16 consecutive identical FC primitive sequence ordered sets. If 16 consecutive identical FC primitive sequence ordered sets are received, the local transport device will move to 2× DONE state at 410, and the speed negotiation is completed. If a loss of sync occurs at 2× WAIT state at 408, the local transport device moves to 1× NEG state at 412.

While the local transport device is in the 2× NEG state at 406, if it does not detect 1000 consecutive valid Ordered Sets within 1 msec, it will move to the 1× NEG state at 412. The 1× states behave similar to the 2× states with 1× WAIT state at 414, and 1× DONE state at 416. If a loss of sync occurs at 1× WAIT state at 414, the local transport device moves to 2× NEG state at 406.

If a loss of signal or loss of word synchronization is detected for greater than a pre-configured timer value then transition to state 418. From state 418, the transport device unconditionally returns to the wait for light state at 404 to resyn. In one embodiment, the timer value is configured to be in conformance with the R-T-TOV timer value specified in the FC-FS standard. Typically, this value is about 100 msec±20 msec.

The local, or ingress, transport device uses the transmission speed, which is stored in the ECH, to forward the client port speed information to the remote, or egress, transport device. Only transport devices with speed negotiation mode enabled will use this field. Transport devices with speed negotiation mode disabled will ignore this field.

By the above implementation, the DWDM transport network avoids the implementation of complex FC speed negotiation state machine and facilitates the FC speed negotiation protocol to be completed across the connected FC clients. Advantageously, the present invention may be implemented in a program storage device readable by a machine, such as a processor, tangibly embodying a program of instructions executable by the machine to perform a method for transporting speed information between a local FC client and a remote FC client across a DWDM network. The method comprises detecting a transmission speed of the local FC client at a local intermediary port and forwarding data from the local FC client along with the transmission speed to a remote intermediary port, said remote intermediary port forwarding said data at the transmission speed to the remote FC client.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

The invention claimed is:

1. A method for negotiating speed between a local Fibre Channel (FC) client and a remote FC client across a dense wavelength division multiplexed (DWDM) network, the method comprising:
    detecting a transmission speed of the local FC client at an ingress transmission interface;
    encapsulating the transmission speed with data from the local FC client at the ingress; and
    forwarding data from the local FC client along with transmission speed data indicating the transmission speed to an egress transmission interface, wherein the transmission speed is specified in an Encapsulation Control Header (ECH), said egress transmission interface forwarding said data at the transmission speed to the remote FC client.

2. The method of claim 1 wherein the local FC client initially transmits at a highest common transmission speed of said FC client and said egress transmission interface.

3. The method of claim 1 wherein said detecting further comprises:
    waiting for a signal or light, in response to a loss of signal or light;
    negotiating a current speed;
    detecting valid data at said current speed; and
    setting said transmission speed of the remote FC client to said current speed.

4. The method of claim 3 further comprising:
    negotiating at a supported speed if no valid data has been detected.

5. The method of claim 3 wherein detecting valid data comprises detecting one of a first plurality of consecutive valid FC ordered sets received within a predetermined time period, and a second plurality of consecutive identical FC primitive sequence ordered sets received; and wherein negotiating the current speed further comprises initially changing a speed of the local FC client from a pre-configured speed to a supported speed and setting the current speed as a next supported speed in response to receiving the signal or light, and changing from the current speed to the next supported speed in response to valid data not being detected at the current speed.

6. The method of claim 3 wherein negotiating the current speed comprises:
   detecting valid data at the current speed based on reception of one of a first plurality of consecutive valid FC ordered sets within a predetermined time period, and a second plurality of consecutive identical FC primitive sequence ordered sets; and
   configuring a physical layer (PHY) by initially configuring the physical layer (PHY) to a first rate, configuring the PHY to a second rate lower than the first rate in response to valid data not being detected at the first rate, configuring the PHY at the first rate in response to loss of sync and the PHY being configured at the second rate, and configuring the PHY at the second rate in response to loss of sync and the PHY being configured at the first rate.

7. The method of claim 1 wherein forwarding further comprises:
   encapsulating the transmission speed in the ECH along with said data; and
   transmitting said encapsulated transmission speed and said data to said egress transmission interface, across the DWDM network.

8. A transport device comprising:
   an ingress transport interface comprising:
      an opto-electrical converter configured to convert a plurality of optical signals into a plurality of electrical signals;
      a deserializer coupled to said opto-electrical converter;
      an encapsulator coupled to said deserializer and configured to encapsulate a transmission speed and data, the transmission speed being encapsulated in an Encapsulation Control Header (ECH); and
      a speed detector configured to receive a loss of signal from said opto-electrical converter, to detect said transmission speed, and to communicate said transmission speed to said encapsulator.

9. The transport device of claim 8 further comprising:
   a synchronizer configured to receive a data signal and a clock signal from said de-serializer and to communicate said transmission speed to said speed detector and to forward said data to said encapsulator.

10. The transport device of claim 8 further comprising an egress transport interface comprising a de-encapsulator configured to receive said data and said transmission speed from said encapsulator.

11. The transport device of claim 10 further comprising a serializer configured to receive said data and said transmission speed from said de-encapsulator.

12. The transport device of claim 10 further comprising:
   an electro-optical converter coupled to an output of said remote serializer.

13. The transport device of claim 8 wherein the speed detector is further configured to negotiate a current speed between the ingress transport interface and a remote Fibre-Channel (FC) client, wherein the speed detector is configured to:
   detect valid data at the current speed by detecting one of a first plurality of consecutive valid FC ordered sets received within a predetermined time period, and a second plurality of consecutive identical FC primitive sequence ordered sets received; and
   initially change a speed of a local Fibre Channel (FC) client from a pre-configured speed rate to a supported speed and to set the current speed as a next supported speed in response to the speed detector receiving the signal or light; and
   change the speed from the current speed to the next supported speed in response to valid data not being detected at the current speed.

14. The method of claim 8 wherein the speed detector is further configured to negotiate a current speed between the ingress transport interface and a remote Fibre-Channel (FC) client, wherein the speed detector is configured to:
   detect valid data at the current speed by detecting one of a first plurality of consecutive valid FC ordered sets received within a predetermined time period; and second plurality of consecutive identical FC primitive sequence ordered sets received;
   initially set a physical layer (PHY) to a first rate;
   set the PHY to a second rate lower than the first rate in response to valid data not being detected at the first rate;
   set the PHY at the first rate in response to loss of sync and the PHY being set at the second rate; and
   set the PHY at the second rate in response to loss of sync and the PHY being set at the first rate.

15. An apparatus comprising:
   an ingress transport interface configured to couple to a transmitting Fibre Channel (FC) client in a dense wavelength division multiplexed (DWDM) network, said ingress transport interface configured to detect a transmission speed used by the transmitting FC client to transmit the data and to transmit an encapsulated signal comprising said transmission speed and said data, the encapsulated signal comprising said transmission speed in an Encapsulation Control Header (ECH); and
   an egress transport interface coupled to a remote FC client in the DWDM network, said egress transport interface device configured to receive said encapsulated signal, extract said transmission speed from said encapsulated signal, and forward said data at said transmission speed to another FC client.

16. The apparatus of claim 15 wherein said ingress transport interface further comprises:
   an opto-electrical converter configured to receive said data from said transmitting FC client and configured to convert a plurality of optical signals into a plurality of electrical signals;
   a deserializer coupled to said opto-electrical converter;
   an encapsulator coupled to said deserializer, said encapsulator configured to transmit said encapsulated signal; and
   a speed detector configured to receive a loss of signal or light from said opto-electrical converter, detect said transmission speed, and communicate said transmission speed to said encapsulator.

17. The apparatus of claim 16 further comprising:
   a synchronizer configured to receive a data signal and a clock signal from said deserializer, to communicate said transmission speed to said speed detector and to forward said data signal to said encapsulator.

18. A system comprising the apparatus of claim 17 and further comprising a remote de-encapsulator configured to receive said data signal and said transmission speed from said encapsulator.

19. The system of claim 18 further comprising:

a remote serializer configured to receive said data signal and said transmission speed from said remote de-encapsulator.

20. The system of claim 19 further comprising:

an electro-optical converter coupled to an output of said remote serializer and to an input of said remote transport device.

21. The apparatus of claim 16 wherein the speed detector is further configured to negotiate a current speed between the ingress transport interface and the other FC client, wherein the speed detector is configured to:

detect valid data at the current speed by detecting one of a first plurality of consecutive valid FC ordered sets received within a predetermined time period, and a second plurality of consecutive identical FC primitive sequence ordered sets received; and initially change a speed of the transmitting FC client from a pre-configured speed rate to a supported speed and to set the current speed as a next supported speed in response to the speed detector receiving signal or light; and change the speed from the current speed to the next supported speed in response to valid data not being detected at the current speed.

22. The apparatus of claim 16 wherein the speed detector is further configured to negotiate a current speed between the ingress transport interface and the other FC client, wherein the speed detector is configured to:

detect valid data at the current speed by detecting one of a first plurality of consecutive valid FC ordered sets received within a predetermined time period, and a second plurality of consecutive identical FC primitive sequence ordered sets received;

initially set a physical layer (PHY) to a first rate;

set the PHY to a second rate lower than the first rate in response to valid data not being detected at the first rate;

set the PHY at the first rate in response to loss of sync and the PHY being set at the second rate; and set the PHY at the second rate in response to loss of sync and the PHY being set at the first rate.

23. A transport device for negotiating speed between a local Fibre Channel (FC) client and a remote FC client across a dense wavelength division multiplexed (DWDM) network comprising:

means for detecting a transmission speed of the local FC client at a transport interface; and means for encapsulating said transmission speed with data from the local FC client, wherein the means for encapsulating is configured to encapsulate the transmission speed in an Encapsulation Control Header (ECH); and means for forwarding said data at said transmission speed to the remote FC client.

24. The transport device of claim 23, wherein the means for detecting the transmission speed includes means for negotiating a current speed between the transport interface and the remote FC client, wherein means for negotiating is configured to:

detect valid data at the current speed by detecting one of a first plurality of consecutive valid FC ordered sets being received within a predetermined time period, and a second plurality of consecutive identical FC primitive sequence ordered sets being received;

initially change a speed of the local FC client from a pre-configured speed to a supported speed and to set the current speed as a next supported speed in response to the means for detecting receiving the signal or light; and change the speed from the current speed to the next supported speed in response to valid data not being detected at the current speed.

* * * * *